(12) United States Patent
Zhang et al.

(10) Patent No.: US 9,444,721 B2
(45) Date of Patent: Sep. 13, 2016

(54) TWO-PART METRIC FOR LINK STATE ROUTING PROTOCOLS

(71) Applicant: Juniper Networks, Inc., Sunnyvale, CA (US)

(72) Inventors: Zhaohui Zhang, Westford, MA (US); Lili Wang, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 201 days.

(21) Appl. No.: 14/042,644

(22) Filed: Sep. 30, 2013

(65) Prior Publication Data

US 2015/0092594 A1     Apr. 2, 2015

(51) Int. Cl.
*H04L 12/28* (2006.01)
*H04L 12/721* (2013.01)
*H04W 40/24* (2009.01)
*H04L 12/751* (2013.01)

(52) U.S. Cl.
CPC ............ *H04L 45/12* (2013.01); *H04L 45/02* (2013.01); *H04W 40/246* (2013.01); *H04W 40/248* (2013.01)

(58) Field of Classification Search
CPC ....................................................... H04L 41/12
USPC ............................................................ 370/254
See application file for complete search history.

(56) References Cited

U.S. PATENT DOCUMENTS

| | | | |
|---|---|---|---|
| 2005/0041676 A1* | 2/2005 | Weinstein | H04L 45/02 370/401 |
| 2007/0086363 A1* | 4/2007 | Wakumoto | H04L 45/02 370/255 |
| 2011/0103228 A1* | 5/2011 | Sheth et al. | 370/238 |
| 2014/0269407 A1* | 9/2014 | Anand et al. | 370/254 |

OTHER PUBLICATIONS

Lindem et al. "OSPFv3 LSA Extendibility" draft-acee-ospfv3-lsa-extend-01.txt, Network Working Group, Internet-Draft, Jul. 15, 2013, 27 pgs.
Oran "OSI IS-IS Intra-domain Routing Protocol" Network Working Group, RFC 1142, Feb. 1990, 157 pgs.
Moy, J. "OSPF Version 2" Network Working Group, RFC 2328, Apr. 1998, 197 pgs.
Katz et al. "Traffic Engineering (TE) Extensions to OSPF Version 2" Network Working Group, RFC 3630, Sep. 2003, 15 pgs.
Berger et al. "The OSPF Opaque LSA Option" Network Working Group, RFC 5250, Jul. 2008, 18 pgs.
Li et al. "IS-IS Extensions for Traffic Engineering" Network Working Group, RFC 5305, Oct. 2008, 18 pgs.
Kompella et al. "IS-IS Extensions in Support of Generalized Multi-Protocol Label Switching (GMPLS)" Network Working Group, RFC 5307, Oct. 2008, 13 pgs.

(Continued)

*Primary Examiner* — Christopher R Crompton
(74) *Attorney, Agent, or Firm* — Shumaker & Sieffert, P.A.

(57) ABSTRACT

Techniques are described for utilizing two-part metrics with link state routing protocols of computer networks. For example, link state advertisements communicated by a router convey outbound cost metrics representative of outbound costs for the router to send network traffic to a network, and inbound cost metrics representative of inbound costs to receive network traffic from the network. The techniques may be particularly useful with respect to shared access networks, including broadcast or non-broadcast multi-access networks.

21 Claims, 6 Drawing Sheets

(56) References Cited

OTHER PUBLICATIONS

Coltun et al. "OSPF for IPv6" Network Working Group, RFC 5340, Jul. 2008, 95 pgs.

Sheth et al. OSPF Hybrid Broadcast and Point-to-Multipoint Interface Type, Internet Engineering Task Force (IETF), RFC 6845, Jan. 2013, 9 pgs.

Extended Search Report from counterpart European Application No. 14185595.7, dated Feb. 20, 2015, 5 pp.

Clausen et al., "The Optimized Link State Routing Protocol Version 2," Mobile Ad hoc Networking (MANET), Internet Draft, draft-ietf-manet-olsrv2-17, Oct. 14, 2012, 110 pp.

Response filed Sep. 29, 2015 to the Extended Search Report from counterpart European Application No. 14185595.7, dated Feb. 20, 2015, 14 pp.

* cited by examiner

TWO-PART METRIC FOR LINK STATE ROUTING PROTOCOLS

TECHNICAL FIELD

The techniques of this disclosure relate to computer networks and, more specifically, providing routing information in computer networks.

BACKGROUND

A computer network is a collection of interconnected computing devices that exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Certain devices within the network referred to as routers use routing protocols to exchange and accumulate topology information that describes the network. This allows a router to construct its own routing topology map of the network. Upon receiving an incoming data packet, the router examines keying information within the packet and forwards the packet in accordance with the accumulated topology information.

Many routing protocols use flooding-based distribution mechanisms to announce topology information to routers within the network. These routing protocols typically rely on routing algorithms that require each of the routers to have synchronized routing topology information. For example, Open Shortest Path First (OSPF) and Intermediate system to intermediate system (IS-IS) routing protocols are link state protocols that use messages conveying link state representations to ensure their routing topology is synchronized with respect to available interfaces, metrics and other variables associated with network links. For example, OSPF utilizes Link State Advertisements (LSAs) while IS-IS uses Link State Protocol Data Units (PDUs) to exchange information. Messages such as the used to convey link state representations in accordance with a link state protocol are generally referred to herein as link state advertisements (LSAs), and OSFP LSAs and IS-IS LS PDUs are examples of such LSAs.

A router operating in accordance without a link state protocol typically floods link state advertisements throughout the network such that every other router receives the link state advertisements. In network topologies where routers are connected by point-to-point connections, each router floods link state advertisements to adjacent routers reachable on each interface to ensure synchronization. In networks using multi-access media, such as an Ethernet network, the routers within the network flood the link state advertisements to all other routers. In either case, the receiving routers construct and maintain their own network topologies using the information received via the link state advertisements. These link state advertisements may include information identifying a cost metric associated with the link, as well as any other constraints commonly employed for selecting a path through a network in accordance with a link state protocol.

Some types of link state advertisements may be rather large in size as a result of, as one example, having to specify a link metric from the advertising router to each of the other routers in the network. In networks where conditions rapidly change, such as radio, satellite, or any other form of wireless-based networks that may be subject to electronic interference, the routers may generate and send large numbers of link state advertisements advertising the change in condition by updating various link metrics very frequently. The number of link state advertisements in these networks may potentially consume significant network bandwidth while also possibly consuming significant processing resources of the routers when generating, processing and sending/receiving these link state advertisements.

SUMMARY

In general, techniques are described in which link state routing protocols utilize two-part metrics in computer networks. For example, link state advertisements communicated by a router, in accordance with the techniques described herein, convey outbound cost metrics representative of outbound costs for the router to send network traffic to a network, and inbound cost metrics representative of inbound costs to receive network traffic from the network. In some examples, the inbound cost metric and the outbound cost metric for a router may be communicated within a single link state message as a two-part metric. The techniques may be particularly useful with respect to shared access networks, including broadcast or non-broadcast multi-access networks (NBMA).

This two-part metric may reduce the number of link state advertisements that have to be sent in comparison to those link state advertisements that make use of a traditional metric, which may be referred to in this disclosure as a "one-part" metric. As described herein, when a router's outbound cost to send traffic to the network or cost to receive traffic from the network changes, the router may only need to send link state advertisements updating the particular cost that changed. This, in turn, reduces any impact on the other routers to recomputed and announce, by way of LSAs, respective updated costs. As a result, the two-part metric may effectively reduce the size of the link state advertisement (and thereby reduce network bandwidth consumption) and the overhead (in terms of memory and processing resources) in generating the link state advertisement while also simplifying advertisement of these link metrics, especially in those networks that may experience rapid and frequent changes in network conditions.

In one example, a method comprises communicating, in accordance with a link state protocol, link state advertisements between a plurality of routers coupled to a shared access network, wherein the link state advertisements specify a set of outbound cost metrics representative of respective outbound costs to send network traffic to the shared access network for each of the plurality of routers and a set of inbound cost metrics representative of respective inbound costs to receive network traffic for each of the plurality routers from the shared access network, and performing path selection based on the set of outbound cost metrics and the set of inbound cost metrics to select paths through the routers of the shared access network.

In another example, a system comprises a plurality of routers that each include one or more processors configured to communicate, in accordance with a link state protocol, link state advertisements between the plurality of routers. The link state advertisements specify a set of outbound cost metrics representative of respective outbound costs to send network traffic to the shared access network for each of the plurality of routers and a set of inbound cost metrics representative of respective inbound costs to receive network traffic for each of the plurality routers from the shared access network. The routers are configured to perform path selection based on the set of outbound cost metrics and the set of inbound cost metrics to select paths through the routers of the shared access network.

In another example, a non-transitory computer-readable storage medium has stored thereon instructions that, when executed, cause one or more processors of a plurality of routers to communicate, in accordance with a link state protocol, link state advertisements between the plurality of routers coupled to a shared access network, wherein the link state advertisements specify a set of outbound cost metrics representative of respective outbound costs to send network traffic to the shared access network for each of the plurality of routers and a set of inbound cost metrics representative of respective inbound costs to receive network traffic for each of the plurality routers from the shared access network, and perform path selection based on the set of outbound cost metrics and the set of inbound cost metrics to select paths between the routers of the sub-network.

The details of one or more aspects of the techniques are set forth in the accompanying drawings and the description below. Other features, objects, and advantages of the techniques will be apparent from the description and drawings, and from the claims.

DETAILED DESCRIPTION

Figure 1:
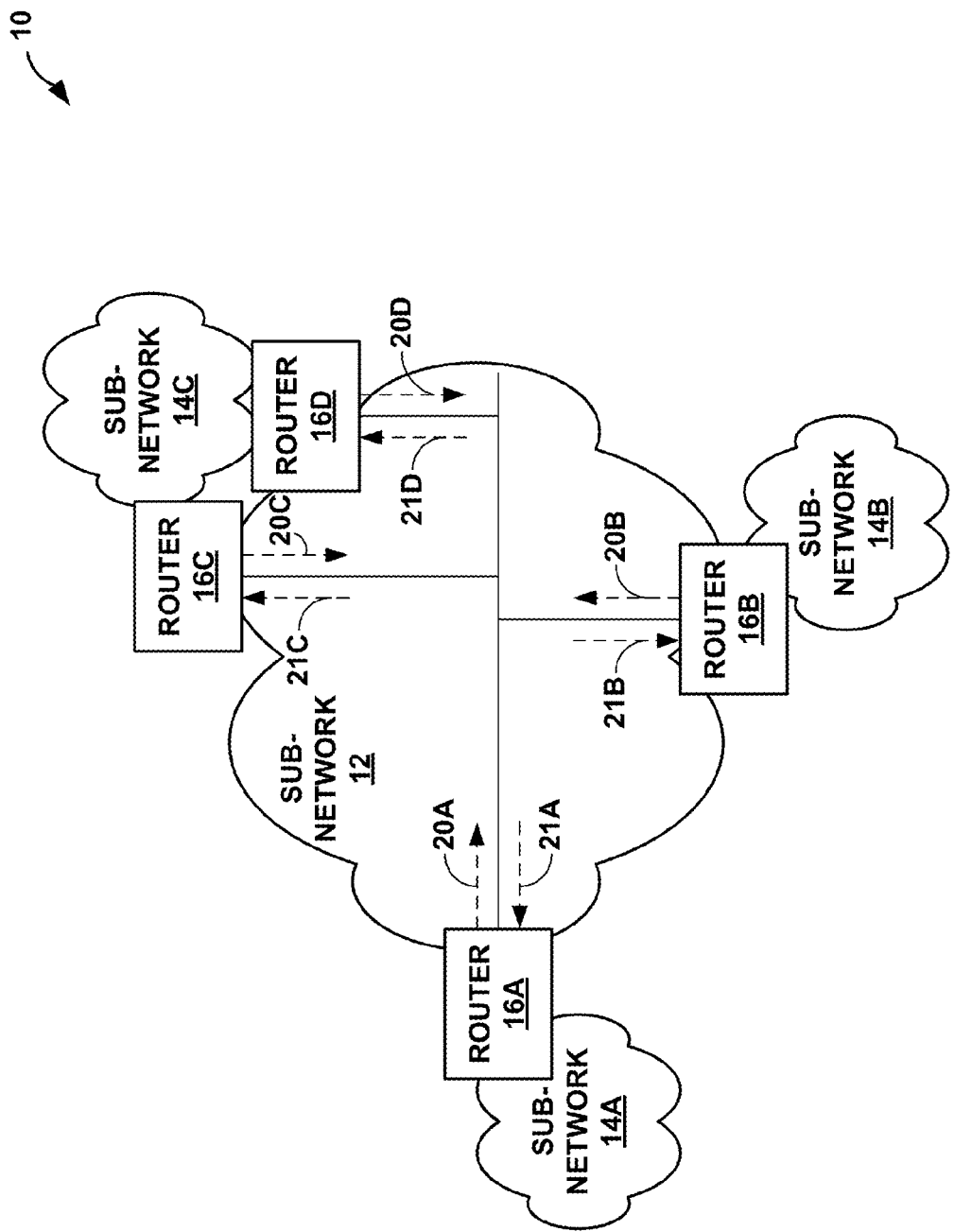
FIG. 1 is a block diagram illustrating an example network that operates using a two-part cost metric in accordance with various aspects of the techniques described in this disclosure.

FIG. 1 is a block diagram illustrating an example network 10 that operates using two-part cost metrics in accordance with various aspects of the techniques described in this disclosure. In the example of FIG. 1, network 10 includes a number of sub-networks, such as sub-networks 12 and sub-networks 14A-14C ("sub-networks 14") interconnected by routers 16A-16D ("routers 16"). In the example of FIG. 1, sub-network 12 represents a shared media access network. Moreover, sub-network 14C is communicatively coupled to sub-network 12 by both routers 16C and 1D and, therefore, may receive traffic from sub-network 12 via both of routers 16C and 16D.

In this example, routers 16 of network 10 implement link state routing protocols to exchange routing information and facilitate forwarding of packets or other data units between endpoint devices throughout the network. While only sub-network 12 is illustrated as a shared media access network, each of sub-networks 14 may comprise a shared media access network or any other type of sub-network. In general, shared access sub-network 12 may be any form of shared access network, such as a broadcast or non-broadcast multi-access network (NBMA). As one example, shared access sub-network 12 may be an Ethernet network coupling routers 16.

Each of routers 16 operate in accordance with a link state protocol to exchange link state advertisements carrying routing information. For example, routers 16 may execute the Open Shortest Path First (OSPF) routing protocol or the Intermediate system to intermediate system (IS-IS) routing protocol, each of which is an example of a link state protocol that uses link state advertisements to convey available interfaces, metrics and other variables associated with network links. For example, OSPF utilizes Link State Advertisements (LSAs) while IS-IS uses Link State Protocol Data Units (PDUs) to exchange information.

In general, link state advertisements output by routers 16 specify network links to other routers within network 10 and associated cost metrics. Based on the communicated link state advertisements, routers 16 construct a graph or other data structure in a manner that reflects the topology of network 10. For example, routers 16 may form a graph data structure with each node of the graph representing a different one of routers 16 or a shared-access network and each edge interconnecting two nodes of the graph representing a different link between a corresponding two of routers 16, or between a router and a shared-access network. Each edge of the graph may be associated with a cost or other edge value that reflects the costs advertised via the LSAs for each of the associated links. With a conventional link state routing protocol, the edge between two router nodes has (potentially different) costs in both directions (i.e. from node 1 to node 2 and from node 2 to node 1), but the edge between a router node and shared-access network node typically only has cost for the router node to network node direction. Routers 16 may then implement a path selection algorithm to determine paths through the network for each source and destination of data packets. For example, routers 16 may implement a constrained shortest path first (CSPF) path selection algorithm to find lowest cost paths from each node to every other node.

After performing path selection, routers 16 forward packets in accordance with the selected paths. As network conditions change, such as when one of routers 16 becomes inoperable, a link goes down or becomes over consumed and slow, one or more of routers 16 may detect the change in network conditions, compute new cost metrics and output link state advertisements to communicate the changes to the other ones of routers 16. Routers 16 process the link state advertisements to update their respective link state databases, and perform path selection based on an updated graph data structure to select new paths through network 10.

In accordance with the techniques described in this disclosure, routers 16 operate in accordance with link state routing protocols that convey two-part metrics for the shared-access networks. For example, link state advertisements communicated by routers 16, in accordance with the techniques described herein, convey outbound cost metrics representative of outbound costs 20 for the router to send network traffic to a network (e.g., a cost to inject traffic into sub-network 12), and inbound cost metrics representative of inbound costs 21 to receive network traffic from the network. In some examples, the outbound cost metric and the inbound cost metric advertised for a given router may be communicated within a single link state message as a two-part metric. Moreover, outbound costs 20 and inbound costs 21 may be the same or different costs for a given one of routers 16, and may be the same or different costs for different routers.

As described herein, rather than provide for a one-part, total cost metric for a link, routers 16 may convey cost information using a two-part cost metric that divides the conventional link state cost metric between routers 16 across a shared-access network into two parts, one expressing an outbound cost for a given router to send traffic to a network and another expressing an inbound cost for the router to receive traffic from the network. In other words, the cost metric set forth in accordance with the techniques described in this disclosure is denoted as a "two-part metric" because the traditional one-part metric that conveyed a link cost between two routers via a shared-access network is divided into two parts, each associated with a different direction of traffic.

The techniques may be particularly useful when a router, such as router 16A, has different cost metric to different ones of routers 16 on a shared-access network, such as sub-network 12. Without using the techniques, router 16A may need to list individual cost metrics in its LSA to different ones of routers 16 on the shared-access network 12. With the techniques, each of routers 16 may only need to list its own inbound/outbound cost metric. For example, to compute the cost to reach any given one of routers 16 by way of sub-network 12 using this two-part metric, each of routers 16 may sum its inbound cost (i.e., the cost to send traffic to sub-network 12) and the outbound cost to send traffic from sub-network 12 to the router, effectively computing the traditional one-part metric.

As a result, the techniques may provide advantages with respect to reducing the number of link state advertisements, and reduce the amount of flooding throughout network 10 in the event of a change in a cost metric. For example, when outbound or inbound cost 20A of router 16A changes, the router may need to only apprise other routers 16 of the updated cost, generating a Router LSA with the changed cost. Router 16A may therefore not have to individually specify in its Router LSA different metrics to routers 16B, 16C and 16D, who in turn may not have to individually specify in their Router LSAs a metric to router 16A, as their respective outbound and inbound costs 20 and 21 to and from the network have not changed, which may drastically reduce the number of LSA that have to be flooded through network 10. As a result, routers 16 will receive fewer LSAs, thereby further reducing processing requirements. In this way, use of a two-part metric may effectively reduce the size of the LSA (and thereby reduce network bandwidth consumption) and the overhead (in terms of memory and processing resources) in generating the LSA while also simplifying advertisement of these link metrics. This may be of particular use in shared access networks that may experience rapid and frequent changes in network costs, such as networks in which at least some of the communications are carried by satellites or other moving network infrastructure.

In operation, one of routers 16, such as router 16A, may determine an outbound cost metric 20A in any number of ways. As an example, router 16A may use a reference bandwidth for cost calculation, dividing this reference bandwidth by measured interface bandwidth. The reference bandwidth may be configured or otherwise determined, or pre-defined. A common reference bandwidth may be, for example, 100 megabits per second (Mbps). Similarly, router 16A may determine an inbound cost metric 20B identifying a cost incurred by traffic received from the network to router 16A and may advertise the outbound and inbound costs 20A and 21A, specifying in some instances each of the costs 20A and 20B as separate costs in separate type-length-value (TLV) fields of the Router LSA.

From the metrics carried by the link state advertisements, each of routers 16 may determine each outbound cost 20 to sub-network 12 from each of routers 16 and each inbound cost 21 from sub-network 12 to each of routers 16. When performing path selection, each router 16 may compute a total cost metric between any pair of routers 16. To illustrate, router 16A may compute a total cost metric from router 16A to router 16C as a function of outbound cost metric 20A from router 16A to sub-network 12 and inbound cost metric 21C from sub-network 12 to router 16C. Likewise, router 16A may compute a total cost metric from router 16A to router 16D as a function of outbound cost metric 20A from router 16A to sub-network 12 and inbound cost metric 21D from sub-network 12 to router 16D. Router 16A may, as one example, sum the outbound cost metric 20A and the inbound cost metric 21C to derive the total cost metric from router 16A to router 16C. While described as an addition of the first and second cost metrics, the techniques may be performed with respect to more involved mathematical computations to derive the total cost metric.

During this path selection process, router 16A may select a path to reach sub-network 14C based, at least in part, on the total cost metric for the path from router 16A to router 16C and the total cost metric computed for the path from router 16A to router 16D. Assuming for purposes of illustration that the path from router 16A to router 16C has a larger total cost metric than the path from router 16A to router 16D, router 16A may perform path selection to select the path from router 16A to router 16D because this path has a lower cost. Routers 16 may, after selecting the paths, program or otherwise provide the paths to (in the form of so-called "forwarding information") the interfaces of routers 16, so that the interfaces may route packets using the selected paths.

In this way, the link state advertisements may specify a set of outbound cost metrics representative of respective outbound costs to communicate network traffic to the shared access network for each of the plurality of routers and a set of inbound cost metrics representative of respective inbound costs to receive network traffic for each of the plurality routers from the share access network. That is, each of routers 16 may generate a separate LSA that specifies the corresponding outbound cost metric for the respective one of routers 16 and/or an inbound cost metric for the respective one of routers 16. In some examples, each of routers 16 may generate a single LSA that specifies the corresponding outbound cost metric for the respective one of routers 16 and an inbound cost metric for the respective one of routers 16. To illustrate, router 16A may generate an LSA that specifies outbound cost metric 20A and inbound cost metric 21A. Router 16B may also generate an LSA that specifies outbound cost metric 20B and inbound cost metric 21B. Router 16C may also generate an LSA that specifies outbound cost metric 20C and inbound cost metric 21C. Router 16D may also generate an LSA that specifies outbound cost metric 20D and inbound cost metric 21D. While described above as specifying both of costs 20 and 21 in a single LSA, each of routers 16 may generate a first LSA that specifies the corresponding outbound cost metric for the respective one of routers 16 and then generate a second different LSA that specifies an inbound cost metric for the respective one of routers 16.

Routers 16 may then perform path selection based on the set of outbound cost metrics 20A-20D and the set of inbound cost metrics 21A-21D to select paths between the routers of the sub-network. That is, each of routers 16 may compute a total cost metric for each path through the network to every other one of routers 16. Router 16A may for example compute a total cost metric to router 16B by adding outbound cost metric 20A to inbound cost metric 21B. Router 16A may also compute a total cost metric to router 16C by adding outbound cost metric 20A to inbound cost metric 21C. Router 16A may also compute a total cost metric to router 16D by adding outbound cost metric 20A to inbound cost metric 21D. To reach sub-network 14C, router 16A may select either the path to router 16C or the path to router 16D, selecting the path having the lowest total cost metric.

While portions of this disclosure are described with respect to OSPF for ease of illustration, the techniques may also be performed in the context of IS-IS or any other link state protocol.

Figure 2:
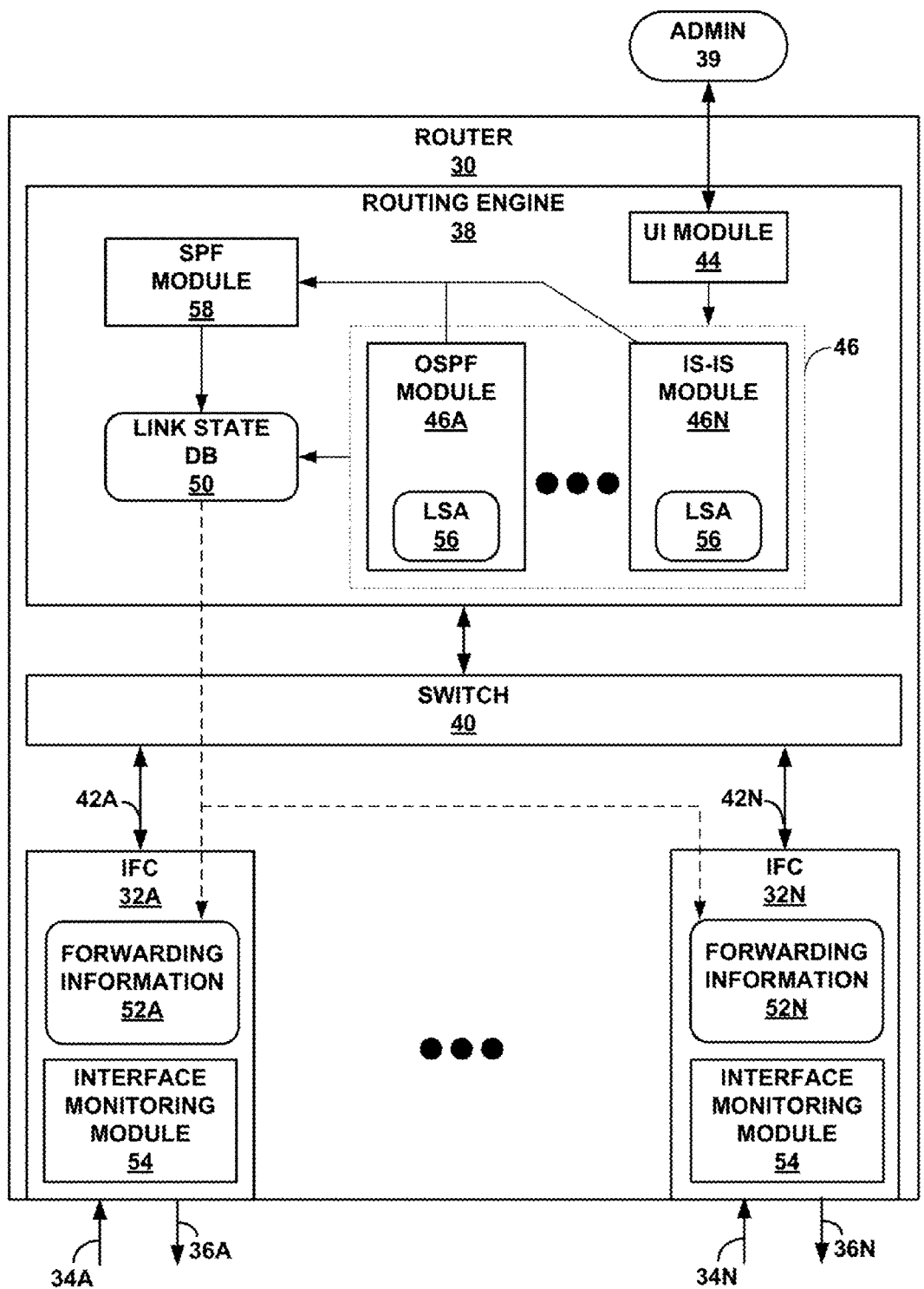
FIG. 2 is a block diagram illustrating an exemplary router that implements techniques described in this disclosure.

FIG. 2 is a block diagram illustrating an exemplary router 30 that performs various aspects of the techniques described in this disclosure. Router 30 may represent one of routers 16 shown in the example of FIG. 1. While described with respect to router 30, the techniques may be implemented by any other type of network device capable of implementing a link state protocol, such as the IS-IS routing protocol or the OSPF routing protocol. Thus, while described with respect to router 30, the techniques should not be limited to exemplary router 30 described with respect to the example of FIG. 2.

In the example of FIG. 2, router 30 includes interface cards 32A-32N ("IFCs 32") that receive and send data units, such as packet flows, via network links 34A-34N and 36A-36N, respectively. Router 30 may include a chassis (not shown) having a number of slots for receiving a set of cards, including IFCs 32. Each card may be inserted into a corresponding slot of the chassis for electrically coupling the card to routing engine 38 via high-speed switch 40 and internal data paths 42A-42N ("internal data paths 42").

Switch 40 also provides an interconnect path between each of IFCs 32. Switch 40 may comprise, for example, switch fabric, switchgear, a configurable network switch or hub, or other high-speed switching mechanisms. Internal data paths 42 may comprise any form of communication paths, such as electrical paths within an integrated circuit, external data busses, optical links, network connections, wireless connections, or other communication paths. IFCs 32 may be coupled to network links 34A-34N and 36A-36N via a number of physical interface ports (not shown). Generally, IFCs 32 may each represent one or more network interfaces by which router 30 may interface with links of a network, such as the links of sub-network 12 shown in the example of FIG. 1.

In general, routing engine 38 operates as a control unit for router 30. Routing engine 38 may comprise one or more of a processor, a programmable processor, a general purpose processor, an integrated circuit, an Application Specific Integrated Circuit (ASIC), a Field Programmable Gate Array (FPGA), or any type of hardware unit capable of implementing the techniques described herein. Routing engine 38 may further include a non-transitory computer readable medium or other computer-readable storage device, which may include dynamic memory (e.g., Random Access Memory or RAM, dynamic RAM or DRAM, and a cache) and/or static memory (e.g., static RAM or SRAM, a Read Only Memory or ROM, and Flash memory), and storage devices, such as Compact Disc ROMs or CDROMs, hard drives, RAM drives, and Digital Video Disc (DVD) drives. In some instances, the computer-readable storage medium may include or otherwise store instructions that, when executed, cause a programmable processor to perform the techniques described herein. These instructions may form a computer program, which may comprise software or other executable files.

Routing engine 38 may further include a user interface (UI) module 44 ("UI module 44") and one or more link state protocol modules 46A-46N ("link state protocol modules 46"). UI module 44 may represent a module that presents a user interface with which an administrator or other user, such as administrator 39 ("admin 39"), may interact to configure one or more of link state protocol modules 46, as well as, routing engine 38 generally. Link state protocol modules 46 may, as shown in the example of FIG. 2, include an OSPF module 46A, an IS-IS module 46N and any other link state protocol. OSPF module 46A represents a module that implements the OSPF routing protocol in accordance with one or more of the RFC 2328, by J. Moy, entitled "OSPF Version 2," dated April 1998, RFC 5340, by R. Coltun et al. entitled "OSPF for IPv6," dated July 2008, RFC 6845, by N. Sheth et al., entitled "OSPF Hybrid Broadcast and Point-to-Multipoint Interface Type," dated January 2013 and Internet Draft for the Network Working Group, by A. Lindem et al., entitled OSPFv3 LSA Extendibility," dated July 2013, each of which are incorporated by reference as if set forth in their respective entireties. IS-IS module 46N represents a module that implements the IS-IS routing protocol in accordance with the IS-IS RFC 1142, by D. Oran, entitled "OSI IS-IS Intra-domain Routing Protocol," dated February 1990, which is hereby incorporated by reference in its entirety.

Routing engine 38 may further include and maintain link state database 50 that stores LSAs and any other information or data used to identify or otherwise determine the network topology. Link state protocol modules 46 may update link state database 50 or otherwise store data specifying the links of the network, including characteristics concerning these links, such as various costs and other metrics. Routing engine 38 may maintain link state database 50 in the form of one or more tables, databases, link lists, radix trees, databases, flat files, graphs or any other data structure. Based on link state database 50, routing engine 38 generates forwarding information 52A-52N ("forwarding information 52") for IFCs 32.

Each of the IFCs 32 includes a forwarding component (not shown) that forwards packets in accordance with forwarding information 52 generated by routing engine 38. Specifically, the forwarding components of IFCs 32 determine a next hop for each inbound IP packet (which may be differentiated from MPLS packets in that these IP packets do not include a label stack) based on forwarding information 52, identify the corresponding one of IFCs 32 associated with the next hop, and relay the packets to the appropriate one of IFCs 32 via switch 40 and corresponding ones of data paths 42. While described above as discrete modules 44-48, the modules may be combined to form a single module or unit or may be implemented separately as distinct hardware or software units. Reference to individual modules is not meant to reflect actual discrete implementations and more than one module may be implemented by the same hardware or combination of hardware or software.

Initially, admin 39 may interface with a user interface, such as a command line interface (CLI) or graphical-user interface (GUI), presented by UI module 44 to configure one or more of link state protocol modules 46. For example, admin 39 may interface with a user interface to indicate that OSPF module 46A is to use the two-part metric provided in accordance with various aspects of the techniques described in this disclosure. After configuring one or more of protocols 46, admin 39 may also interface with a user interface to input link data associating one or more links with costs or metrics. In some examples when a so-called asymmetric cost metric (meaning that the cost metric to the network from the router is different from the cost metric to the router form the network) is required or preferred, admin 36 may interface with a user interface to specify both of these cost metrics. UI module 44 may store this link data to link state database 50 as a new entry or may update link state database 50 based on the input link data to reflect the new metrics or costs defined by this link data for the corresponding links.

After configuring routing engine 38 in this manner, admin 39 may then activate or otherwise enable router 30 to begin processing packets, such as standard IP packets that are forwarded in accordance with forwarding information 52. Prior to receiving these packets, one of more of modules 46 may generate a LSA 56 that includes a link similar to Link Type 2 in the context of OSPF. The new type indicates that sub-network 12 is using a two-part metric defined in accordance with various aspects of the techniques described in this disclosure. Moreover, LSA 56 may include more links as with the conventional link state protocol.

For example, OSPF module 46A may generate LSA 56 to include both the outbound cost to send traffic to sub-network 12 from router 30 and the inbound cost to receive traffic from sub-network 12. In some instances, LSA 56 may only specify a cost to sub-network 12 from router 30, where the cost to router 30 from sub-network 12 is assumed to be the same as the cost to sub-network 12 from router 30. In these and other examples, rather than using the hybrid interface type set forth in the above incorporated RFC 6845, sub-network 12 is configured as a broadcast network or a NBMA network, where router 30 and, more specifically, OSPF 46A may no longer list individual metrics to each neighbors specified in a router LSA. In this example, the router LSA may specify a single link to sub-network 12 utilizing the techniques described in this disclosure. In contrast, a router that does not implement the techniques described in this disclosure would ordinarily list the cost metric to each other one of routers 16, when treating the interface as hybrid interface type.

According to the techniques of this disclosure, OSPF 46A may generate an LSA 56 that no longer lists the cost metrics for each connection to every other one of routers 16, but may only specify a link with a metric that represents the symmetric outbound metric to/from sub-network 12 from router 30 or, in the case of an asymmetric metric, the link outbound metric 20A to sub-network 12 from router 30 and the inbound link metric 20B to router 30 from sub-network 12. In OSPFv3, the router LSA 56 may specify the asymmetric inbound metric from the network in an additional type-length-value (TLV) field while using the ordinary cost metric field to specify the outbound cost from router 30 to sub-network 12 For OSPFv2, a type of service (TOS) metric field may be used to specify the cost from sub-network 12 to router 30 (and the ordinary cost metric field may be used to specify the cost from router 30 to sub-network 12). Although described in the context of TOS metric fields, the techniques may be performed with respect to other types of fields, including a so-called Multi-Topology (MT) metric.

Router 30 may also receive LSAs via IFCs 32 from other ones of routers 16. IFCs 32 may be configured to forward routing protocol packets or control packets, such as these received LSAs, via switch 40 to routing engine 38. Link state protocol modules 46 may then process these LSAs, where one or more of these LSAs may include two-part cost metrics. This one of link state protocol modules 46 then stores the advertised link, including its costs and other information to link state database 50.

In response to updating link state database 50, one of link state protocol modules 46 may invoke SPF module 58, which resolves its corresponding portion of link state database 50 to generate forwarding information 52. The one of link state protocol modules 46 may then configure or otherwise update IFCs 32 with the newly resolved forwarding information 52. IFCs 32 may continue to receive and forward IP packets in accordance with forwarding information 52.

While forwarding packets, one or more of IFCs 32 may invoke or otherwise execute interface monitoring module 54. Interface monitoring module 54 may represent a module that monitors interfaces of IFC 32A to identify change of communication capability via each of the links (often, by measuring bandwidth). When the change exceeds a threshold, as one example, interface monitoring module 54 may interface with one or more of link state protocol modules 46 to indicate or otherwise specify that a particular link has a degradation of communication beyond the threshold degradation. The one or more of link state protocol modules 46 may then generate a router LSA 56 indicating that the cost metric to router 30 from sub-network 12 has changed (and possibly that the cost metric from router 30 to sub-network 12 has changed) for the identified link.

Likewise, router 30 may receive LSA 56 with these two-part metrics, invoke SPF module 58 to resolve link state database 50. As part of the SPF process, SPF module 58 may compute the total cost metric to the one of routers 16 that sent LSA 56, update link state database 50 to include this newly computed total cost metric, generate updated forwarding information 52 and install this forwarding information 52 in IFCs 32. Router 30 may then begin routing packets according to this newly installed forwarding information 52. Router 30 may continue to monitor the links to which one or more of IFCs 32 are coupled, generating LSAs 56 and receiving LSAs similar to LSAs 56.

Figure 3A:
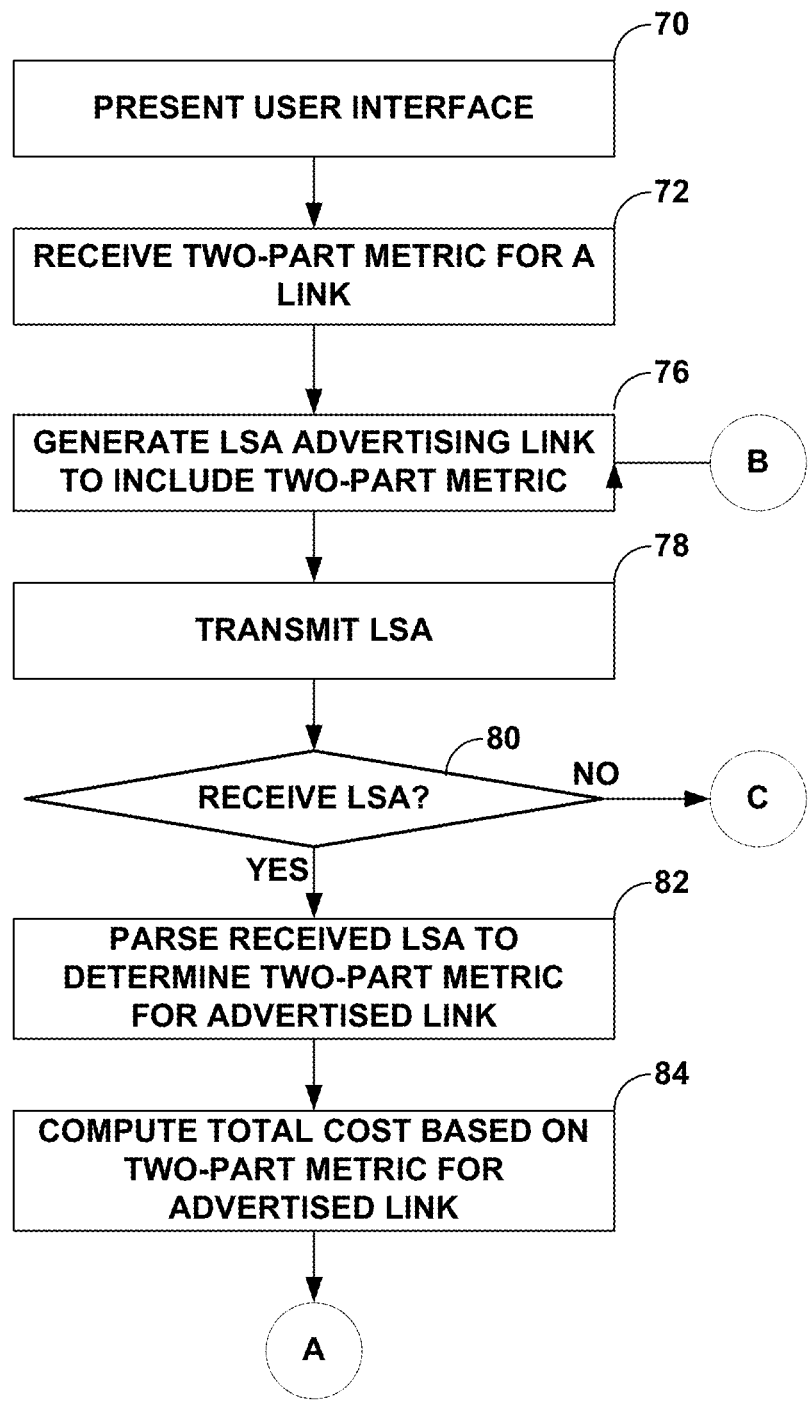
FIGS. 3A and 3B are flowcharts illustrating example operation of a network device in implementing the techniques described in this disclosure.
Figure 3B:
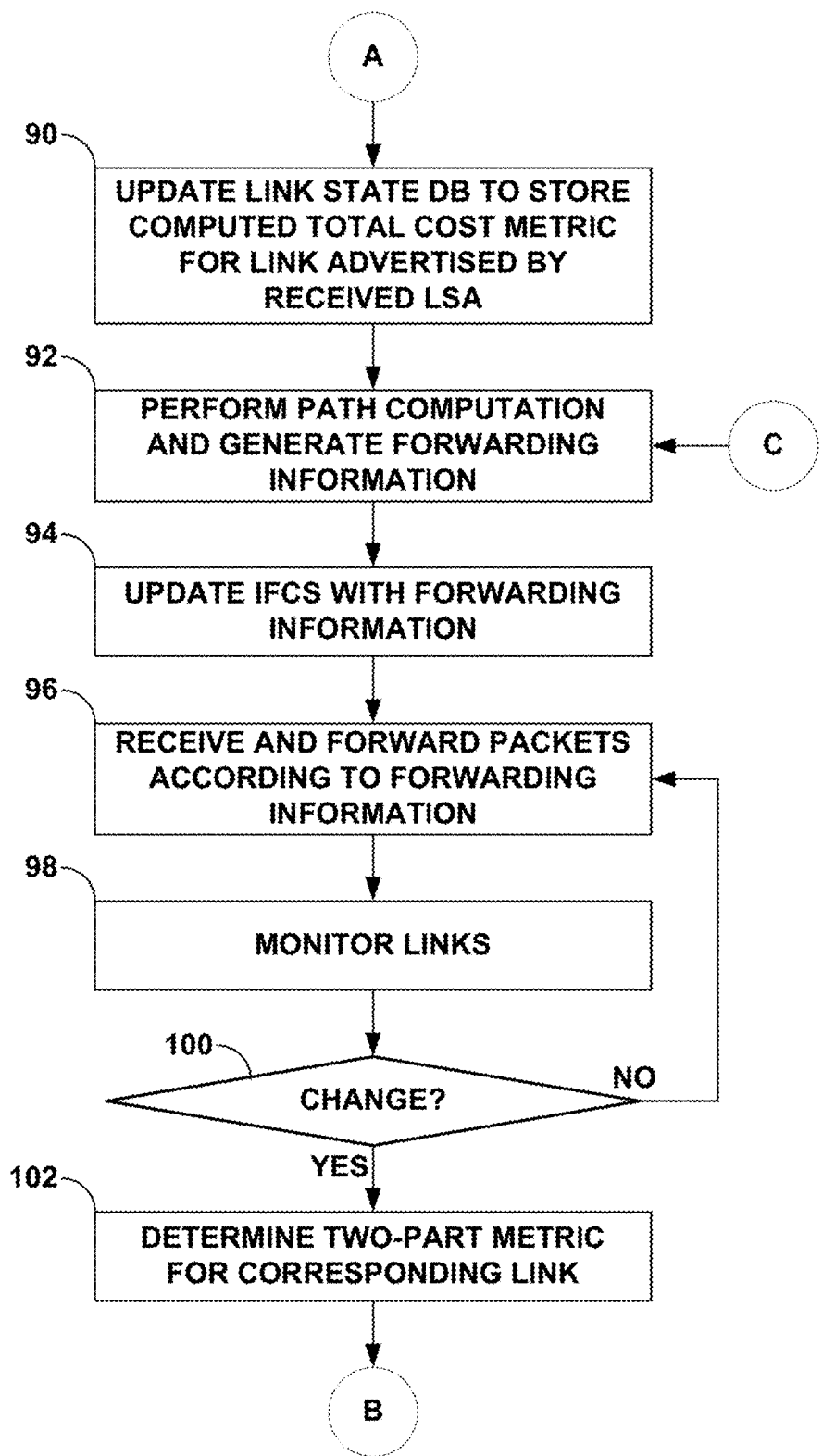

FIGS. 3A and 3B are flowcharts illustrating example operation of a network device, such as router 30 shown in the example of FIG. 2, in implementing the techniques described in this disclosure. Initially, referring first to the example operation shown in FIG. 3A, UI module 44 of router 30 presents a user interface with which admin 39 interfaces to input two-part cost metrics, which may include a cost to sub-network 12 from route 30 and/or a cost from sub-network 12 to router 30 (70). UI module 44 receives this two-part metric (72).

In response, a link state protocol module may generate and transmit an LSA 56 advertising, in this example, the link updated by the two-part metric (76, 78).

In operation, router 30 may receive Router LSAs from other ones of routers 16 having link state information (80). Upon receiving a Router LSA ("YES" 80), routing engine 38 of router 30 may invoke an appropriate one of link state protocol modules 46, which parses the received Router LSA to identify the advertised link and any other costs or metrics, including the two-part metric, associated with the advertised link (82). When parsing this received Router LSA, the link state protocol module 46 may parse the two-part metric and compute the total cost metric for the associated link based on the parsed two-part metric (82, 84). Referring to FIG. 3B, the link state protocol module 46 may then update the link in link state database 50 to update the cost metric for the associated link based on the computed total cost metric (90).

In response to updating link state database 50 (or, periodically in some instances), the one of link state protocol modules 46 may invoke SPF 58 to resolve the link state database 50 to determine updated forwarding information 52 and updates IFCs 32 with updated forwarding information 52 (92, 94). IFCs 32 may then receive and forward packets according to updated forwarding information 52.

In some instances, the one of link state protocol modules 46 may not receive an LSAs ("NO" 86), whereupon the one of link state protocol modules 46 may invoke SPF module 58 to resolve link state database 50 and thereby determine forwarding information 52 (assuming that link state database 50 was updated by link data) (92). SPF module 58 may then update IFCs 32 with this updated forwarding information 52, whereupon IFCs 32 receive and forward packets according to updated forwarding information (94, 96). While forwarding packets, IFCs 32 may invoke link monitoring module 54, which may monitor the links to which router 30 couples (98). In response to detecting a change in the links ("YES" 100), link monitoring module 54 may interface with one or more of link state protocol modules 46 to inform these one or more of link state protocol modules 46 of the change. The one or more of link state protocol modules 46 may then determine the two-part metric for the corresponding link (102), generate Router LSA 56 to announce this update to the link (e.g., the change in the two-part metric) (76) and transmit this Router LSA 56 (78).

Router 30 may continue to operate in this manner, transmitting and receiving LSAs to updated link state database 50, perform path selection to generate forwarding information 52 for controlling the forwarding packets.

Figure 4:
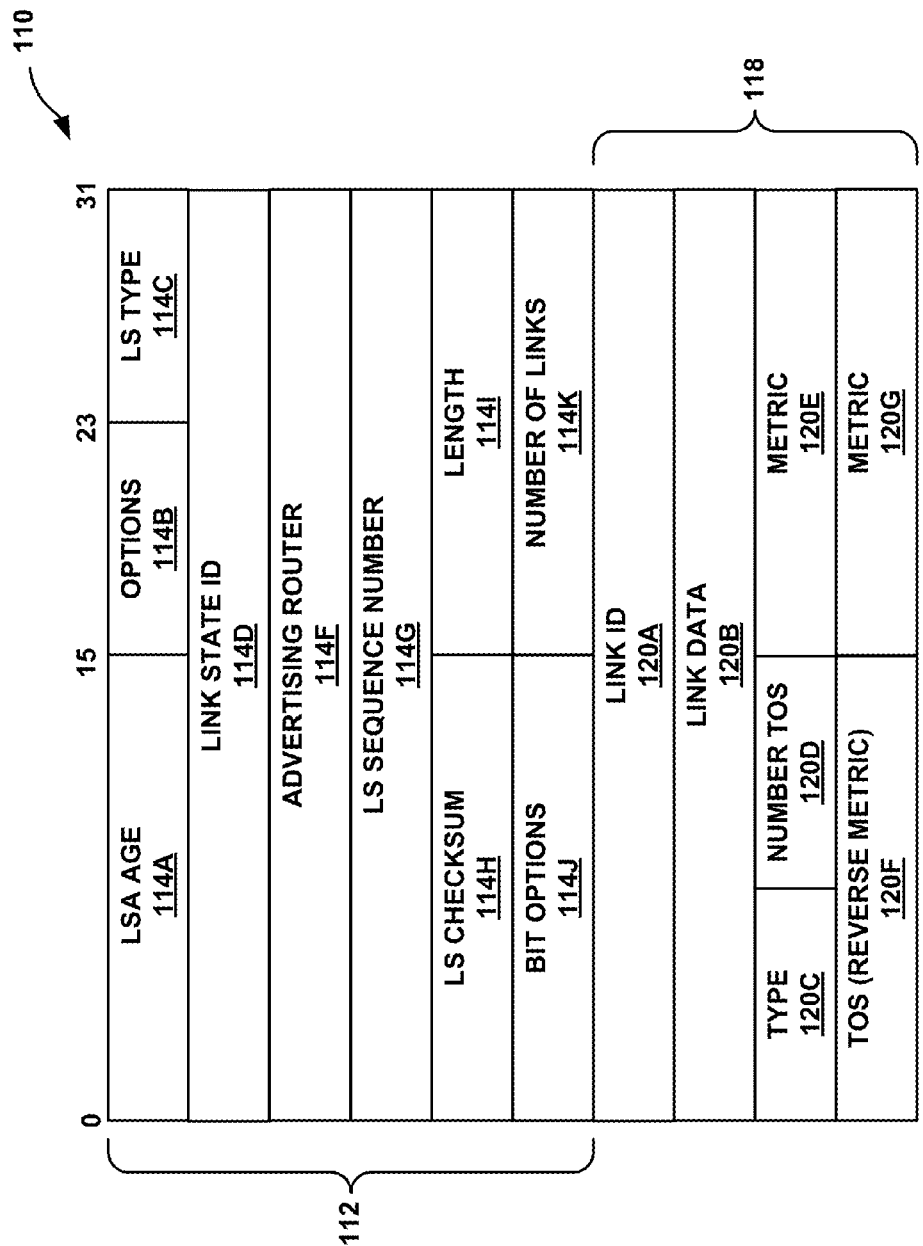
FIG. 4 is a block diagram illustrating an exemplary Link State Advertisement (LSA) that specifies a two-part cost metric in accordance with techniques described in this disclosure.

FIG. 4 is a block diagram illustrating an exemplary Link State Advertisement (LSA) 110 that includes a two-part metric in accordance with techniques described in this disclosure. Moreover, LSA 110, as shown in the example of FIG. 4, may comply with the OSPF protocol in that it adheres to the four byte width limitation specified by the OSPF protocol. That is, LSA 110 comprises a set of four-byte rows, as reflected in FIG. 4 by the 0-31 bit range for each row shown at the top of LSA 110. Further details of the format of opaque OSPF LSAs can be found in RCE 5250, Internet Engineering Task Force (IETF), July 2008 herein incorporated by reference. While described with respect to OSPF routing protocol, the techniques may be similarly implemented with respect to any other link state protocol, such as the IS-IS routing protocol.

As shown in FIG. 4, LSA 110 includes an LSA header 112. LSA header 112 comprises an LSA age field 114A ("LSA age 114A"), an options field 114B ("options 114B"), an LS type field 114C ("LS type 114C"), a link state identifier field 114D ("link state ID 114D"), an advertising router field 114F ("advertising router 114F"), a link state sequence number field 114G ("LS sequence number 114G"), a link state checksum field 114H ("LS checksum 114H") and a length field 114I ("length 114I"). Although shown as comprising fields 114A-114I ("fields 114"), LSA header 112 may comprise more or less fields 114 than that shown in FIG. 4.

LS age field 114A typically specifies the age of the LSA 110 in seconds and is used to distinguish between two LSAs specifying the same LSA sequence number in their respective LS sequence number field 114F. Options field 114B may specify which optional capabilities are associated with the LSA 110. LS type field 114C indicates the format and function of the LSA 110, i.e., the type of LSA. LSA type field 114C may specify a value of one to indicate this is a router LSA. Link state ID field 114D typically identifies a portion of the routing domain that is being described by LSA 110. Advertising router field 114E may specify the OSPF router identifier of the LSA 110's originator. LS sequence number field 114F may comprise a signed 32-bit integer that OSPF modules use to detect old and duplicate LSAs. LS checksum field 114G may indicate whether the LSA accompanying LSA header 112 contains errors, which may be employed to discard possibly faulty LSAs 110. Length field 114H indicates the length of LSA 110. More information regarding general OSPF and the headers of OSPF LSA can be found in RFC 3630, entitled "Traffic Engineering (TE) Extensions to OSPF Version 2," the entire contents of which are incorporated by reference as if set forth in their entirety herein.

For router LSA 110, header 112 may also include bit options field 114J and a number of links field 114K. Bit options field 114J may specify one or more bits that indicate whether the router is an endpoint of one or more fully adjacent virtual links having the described area as "Transit" area, that the advertising router is an autonomous system boundary router, and/or that the router is an area border router. Number of links field 114K may specify the number of router links described in his LSA (which is commonly the total collection of router links, meaning in some instances interfaces, to the area).

LSA 110 also includes additional field set 118. Field set 118 represents a link or interface field. Field set 118 includes a link identifier (ID) field 120A, a link data field 120B, a type field 120C, a number of type of services (TOS) field 120D, a metric field 120E, a TOS (reverse metric) field 120F and another metric 120G.

Link ID field 120A identifies the object to which this router link connects, where the value depends on the link's type (specified, for example, in corresponding type field 120C of TLV 118). Link data field 120B may represent a field that specifies a value that depends on the link's type field. Link data field 120B may specify, as one example, the router interface's IP address. Number TOS field 120D may specify the number of different TOS metrics given for this link, not counting the required link metric. If no additional TOS metrics are given, this field 120D is set to zero. When the reverse metric is specified (meaning the metric denoting a cost from the network to the advertising router), number TOS field 120D may specify a value of one (or any other value capable of being stored to number TOS field 120D. Metric field 120E represents a field that stores a cost of using this router link. As noted above, when this number TOS field 120D is set to anything but zero, TOS field 120F may specify a value indicating what is specified in the accompanying metric field 120G. In this example, TOS field 120F may specify a value to indicate that metric field 120G stores a cost of using this router link in the "reverse" direction, which in this example may refer to the cost from the network to the advertising router. Metric field 120G may then specify this reverse direction cost.

While described above with respect to OSPF LSA 110, IS-IS formatted Link State Protocol Data Units (PDU), which may be abbreviated as LSPs, may be similar in construction to OSPF LSA 110, except for defining different values for the type of the traffic engineering metric TLV and the interface input cost metric TLV. The format and general construction of IS-IS TLVs may be found in RFC 5305, by T. Li et al., entitled "IS-IS Extensions for Traffic Engineering," dated October 2008 and RFC 5307, by K. Kompella et al., entitled "IS-IS Extensions in Support of Generalized Multi-Protocol Label Switching (GMPLS)," dated October 2008, the entire contents of which are hereby incorporated by reference as if set forth in their entirety.

Figure 5:
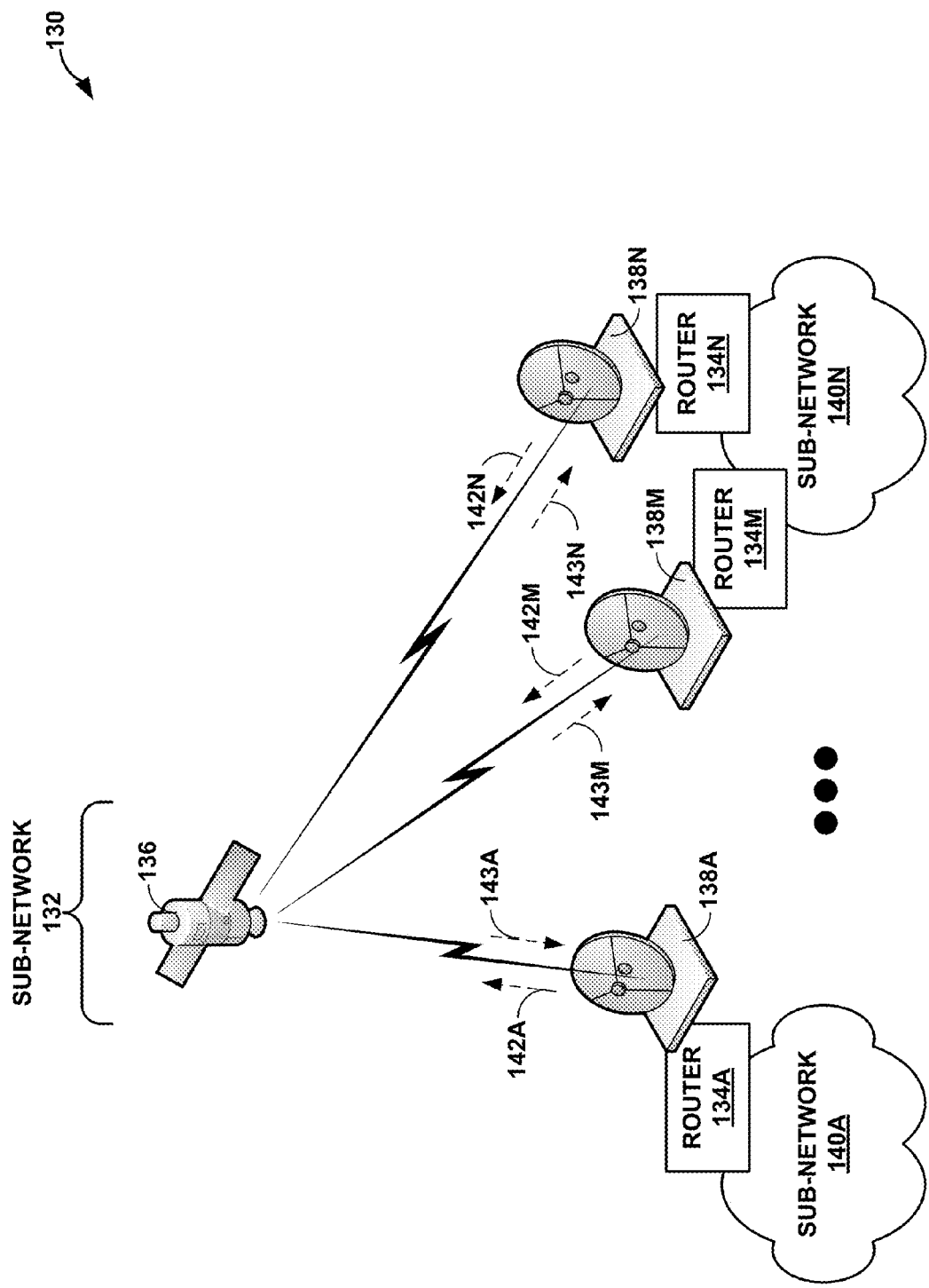
FIG. 5 is a block diagram illustrating another example network that operates using a two-part cost metric in accordance with various aspects of the techniques described in this disclosure.

FIG. 5 is a block diagram illustrating another network 130 that may implement various aspects of the techniques described in this disclosure. Network 130 includes a sub-network 132 that operate as a shared multi-access network that includes a satellite 136 to which routers 134A-134N ("routers 134") are coupled via respective ones of satellite dish devices 138A-138N ("satellite dishes 138"). Routers 134 may be substantially similar to routers 16 and 30 shown in the example of FIGS. 1 and 2. Each of satellite dishes 138 may be capable of communicating (possibly concurrently) with satellite 136 of sub-network 132.

The techniques described herein may be particularly suited for reducing the number of LSAs flooded within network 130 due to cost changes associated with forwarding traffic via satellite 136. Networks having satellite-based infrastructure for forwarding packets, such as network 130, may experience significant changes in individual transmission links, especially in the event that routers 134 may be mobile and, therefore, move behind building or other obstacles, such as mountains, or through other geological obstacles, such as valleys, that may degrade the line-of-sight signal often necessary to communicate with the satellites. As a result, routers 134 may experience changing communications capabilities with satellite 136, typically resulting in rapid and nearly constant changes to the communication capability between routers 134 and satellite 136. By utilizing the techniques described herein, each of routers 134 may issue link state advertisements announcing only the changed inbound costs 143A-143N ("inbound cost metrics 143") or outbound costs metrics 142A-142N ("outbound cost metrics 142") to communicate via sub-network 132, which may in turn reduce the number of updates and overall LSAs flooded within sub-network 132 and, more generally, network 130.

In this shared multi-access sub-network environment, routers 134 may use the two-part metric in accordance with the techniques described above to potentially drastically reduce the number of LSAs and the size of each LSA. That is, routers 134 may each adversities outbound cost metrics 142 with respect to sending traffic to subnet 132 and inbound cost metrics 143 with respect to receiving traffic from subnet 132. Router 134A may interface via an uplink in this example to communicate with sub-network 132, as a result, may advertise by way of LSA outbound cost metric 142A and inbound cost metric 143A. Router 134A may then generate a Router LSA similar to Router LSA 110 shown in the example of FIG. 4 and flood this Router LSA to each of the other routers 134. In this satellite-based shared access network configuration, the techniques may reduce the size and number of LSAs that need to be sent, especially in situations where one or more of routers 134 may be moving or experiencing rapid changes to link capacity (in terms of bandwidth).

As described above with respect to FIG. 1, router 134A may identify two paths to sub-network 140A, one of which is through router 134M and the other of which is through router 134N. Router 134A may compute a first total cost metric for the path through router 134M based on the outbound cost 142A and the inbound cost 143M to router 134M. Router 134A may also compute a second total cost metric for the path through router 134N based on the outbound cost 142A from router 134A and the inbound cost 143N. Router 134A may then select one of these paths based on the first total cost metric and the second total cost metric. In response to changes to the outbound cost 142A of router 134A, router 134A may generate a Router LSA to inform the other routers 134 of this cost change and re-compute the total cost metrics for each of these paths. In this way, the techniques may reduce the number and size of Router LSAs that may need to be sent in response to changes to cost metrics.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a non-transitory computer-readable storage medium, containing instructions. Instructions embedded or encoded in a computer-readable medium may cause a programmable processor, or other processor, to perform the method, e.g., when the instructions are executed. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various aspects of the techniques have been described. These and other aspects are within the scope of the following claims.

The invention claimed is:
1. A method comprising:
communicating, in accordance with a layer three link state protocol, link state advertisements (LSAs) between a plurality of layer three routers coupled to an intermediate layer two shared access network, wherein the link state advertisements specify a set of outbound cost metrics representative of respective outbound costs to send network traffic to the intermediate layer two shared access network for each of the plurality of layer three routers and a set of inbound cost metrics representative of respective inbound costs to receive network traffic for each of the plurality layer three routers from the intermediate layer two shared access network;

computing, with a first one of the plurality of layer three routers, a total cost metric for each link through the intermediate layer two shared access network that originates at the first one of the plurality of layer three routers and terminates at each remaining one of the plurality of layer three routers based on one of the outbound cost metrics for the first one of the plurality of layer three routers and the corresponding inbound cost metrics for each of the remaining ones of the plurality of layer three routers;

performing path selection based on the total cost metrics; and forwarding network traffic based on the path selection.

2. The method of claim 1, wherein each of the plurality of layer three routers communicates its respective one of the set of outbound cost metrics and its respective one of the set of inbound cost metrics in a single LSA.

3. The method of claim 1, further comprising generating a representation of a topology graph of the plurality of layer three routers in which a communication path from the first one of the plurality of layer three routers to a second one of the remaining plurality of layer three routers through the shared access network is represented as a single edge connecting a first node to a second node in the topology graph, wherein computing the total cost metric comprises computing one of the total cost metrics for the single edge as a summation of the one of the outbound cost metrics for the first one of the plurality of layer three routers and one of the inbound cost metrics for the second one of the plurality of layer three routers, wherein the method further comprises assigning the one of the total cost metrics to the single edge in the topology graph, and wherein performing the path selection comprises performing the path selection based on the one of the total cost metrics assigned to the single edge of the topology graph.

4. The method of claim 1, wherein communicating the link state advertisements comprises transmitting, with the first one of the plurality of layer three routers, one of the link state advertisements that specifies both the one of the outbound cost metrics for the first one of the plurality of layer three routers representative of one of the outbound costs from the first one of the plurality of layer three routers to the shared access network and one of the inbound cost metrics for the first one of the plurality of layer three routers representative of one of the inbound costs to the first one of the plurality of layer three routers from the shared access network using a single field of the one of the link state advertisements.

5. The method of claim 4, wherein the single field of the one of the link state advertisements stores the one of the outbound cost metrics for the first one of the plurality of layer three routers but not a corresponding one of the inbound cost metrics for the first one of the plurality of layer three routers, wherein the one of the outbound cost metrics for the first one of the plurality of layer three routers specifies both the one of the outbound cost metrics for the first one of the plurality of layer three routers and the corresponding one of the inbound cost metrics for the first one of the plurality of layer three routers.

6. The method of claim 1, wherein communicating the link state advertisements comprises transmitting, with the first one of the plurality of layer three routers, one of the link state advertisements that specifies the one of the outbound cost metrics for the first one of the plurality of layer three routers representative of one of the outbound costs from the first one of the plurality of layer three routers to the shared access network in a first field of the one of the link state advertisements and one of the inbound cost metrics for the first one of the plurality of layer three routers representative of one of the inbound costs to the first one of the plurality of layer three routers from the shared access network in a second field of the one of the link state advertisements different than the first field.

7. The method of claim 1, wherein communicating the link state advertisements comprises receiving, with the first one of the plurality of layer three routers, one of the link state advertisements that specifies one of the outbound cost metrics for a second one of the plurality of layer three routers representative of one of the outbound costs from the second one of the plurality of layer three routers to the shared access network in a first field of the one of the link state advertisements and one of the inbound cost metrics for the second one of the plurality of layer three routers representative of one of the inbound costs to the second one of the plurality of layer three routers from the shared access network in a second field of the one of the link state advertisements different than the first field.

8. The method of claim 1, further comprising advertising that the intermediate layer two shared access network operates by advertising inbound cost metrics and the outbound cost metrics or that the intermediate layer two shared access network operates by advertising the total cost metrics.

9. The method of claim 1, wherein the intermediate layer two shared access network comprises either a broadcast network or a non-broadcast multi-access network.

10. The method of claim 1, wherein the layer three link state routing protocol comprises either an Open Shortest Path First (OSPF) routing protocol or an Intermediate system to intermediate system (IS-IS) routing protocol.

11. A system comprising:
a plurality of layer three routers coupled to an intermediate layer two shared access network and that each include one or more processors configured to communicate, in accordance with a layer three link state protocol, link state advertisements (LSAs) between the plurality of layer three routers, wherein the link state advertisements specify a set of outbound cost metrics representative of respective outbound costs to send network traffic to the intermediate layer two shared access network for each of the plurality of layer three routers and a set of inbound cost metrics representative of respective inbound costs to receive network traffic for each of the plurality layer three routers from the intermediate layer two shared access network, and wherein a first one of the plurality of layer three routers is configured to compute a total cost metric for each link through the intermediate layer two shared access network that originates at the first one of the plurality of layer three routers and terminates at each remaining one of the plurality of layer three routers based on one of the outbound cost metrics for the first one of the plurality of layer three routers and the corresponding inbound cost metrics for each of the remaining ones of the plurality of layer three routers, perform path selection based on the total cost metric, forward network traffic based on the path selection.

12. The system of claim 11, wherein each of the plurality of layer three routers communicates its respective one of the set of outbound cost metrics and its respective one of the set of inbound cost metrics in a single LSA.

13. The system of claim 11, wherein the first one of the plurality of layer three routers is further configured to generate a representation of a topology graph of the plurality of layer three routers in which a communication path from the first one of the plurality of layer three routers to a second one of the remaining plurality of layer three routers through the shared access network is represented as a single edge connecting a first node to a second node in the topology graph, compute one of the total cost metrics for the single edge as a summation of the one of the outbound cost metrics for the first one of the plurality of layer three routers and one of the inbound cost metrics for the second one of the plurality of layer three routers, assign the one of the total cost metrics to the single edge in the topology graph, and perform the path selection based on the one of the total cost metrics assigned to the single edge of the topology graph.

14. The system of claim 11, wherein the first one of the plurality of layer three routers is further configured to, when communicating the link state advertisements, transmit one of the link state advertisements that specifies both the one of the outbound cost metrics for the first one of the plurality of layer three routers representative of one of the outbound costs from the first one of the plurality of layer three routers to the shared access network and one of the inbound cost metrics for the first one of the plurality of layer three routers representative of one of the inbound costs to the first one of the plurality of layer three routers from the shared access network using a single field of the one of the link state advertisements.

15. The system of claim 14, wherein the single field of the one of the link state advertisements stores the one of the outbound cost metrics for the first one of the plurality of layer three routers but not a corresponding one of the inbound cost metrics for the first one of the plurality of layer three routers, wherein the one of the outbound cost metrics for the first one of the plurality of layer three routers specifies both the one of the outbound cost metrics for the first one of the plurality of layer three routers and the corresponding one of the inbound cost metrics for the first one of the plurality of layer three routers.

16. The system of claim 11, wherein the first one of the plurality of layer three routers is further configured to transmit one of the link state advertisements that specifies the one of the outbound cost metrics for the first one of the plurality of layer three routers representative of one of the outbound costs from the first one of the plurality of layer three routers to the shared access network in a first field of the one of the link state advertisements and one of the inbound cost metrics for the first one of the plurality of layer three routers representative of one of the inbound costs to the first one of the plurality of layer three routers from the shared access network in a second field of the one of the link state advertisements different than the first field.

17. The system of claim 11, wherein the first one of the plurality of layer three routers are further configured to receive one of the link state advertisements that specifies one of the outbound cost metrics for a second one of the plurality of layer three routers representative of one of the outbound costs from the second one of the plurality of layer three routers to the shared access network in a first field of the one of the link state advertisements and one of the inbound cost metrics for the second one of the plurality of layer three routers representative of one of the inbound costs to the second one of the plurality of layer three routers from the shared access network in a second field of the one of the link state advertisements different than the first field.

18. The system of claim 11, wherein the first one of the plurality of layer three routers is further configured to advertise that the intermediate layer two shared access network operates by advertising the inbound cost metrics and the outbound cost metrics or that the intermediate layer two shared access network operates by advertising the total cost metrics.

19. The system of claim 11, wherein the intermediate layer two shared access network comprises either a broadcast network or a non-broadcast multi-access network.

20. The system of claim 11, wherein the layer three link state routing protocol comprises either an Open Shortest Path First (OSPF) routing protocol or an Intermediate system to intermediate system (IS-IS) routing protocol.

21. A non-transitory computer-readable storage medium having stored thereon instructions that, when executed, cause one or more processors of a plurality of layer three routers to:
communicate, in accordance with a layer three link state protocol, link state advertisements between the plurality of layer three routers coupled to an intermediate layer two shared access network, wherein the link state advertisements specify a set of outbound cost metrics representative of respective outbound costs to send network traffic to the intermediate layer two shared access network for each of the plurality of layer three routers and a set of inbound cost metrics representative of respective inbound costs to receive network traffic for each of the plurality layer three routers from the intermediate layer two shared access network;
compute a total cost metric for each link through the intermediate layer two shared access network that originates at the first one of the plurality of layer three routers and terminates at each remaining one of the plurality of layer three routers based on one of the outbound cost metrics for the first one of the plurality of layer three routers and the corresponding inbound cost metrics for each of the remaining ones of the plurality of layer three routers;
perform path selection based on the total cost metrics; and
forward network traffic based on the path selection.

* * * * *